United States Patent [19]
Bochot et al.

[11] Patent Number: 5,356,339
[45] Date of Patent: Oct. 18, 1994

[54] TORSION DAMPING DEVICE WITH PERIPHERAL RESILIENT MEANS ARRANGED IN A SEALED HOUSING, PARTICULARLY FOR AUTOMOTIVE VEHICLES

[75] Inventors: Jean-Claude Bochot, Claye Souilly; Pierre Casse, Ermont, both of France

[73] Assignee: Valeo, Paris, France

[21] Appl. No.: 952,214

[22] Filed: Sep. 28, 1992

Related U.S. Application Data

[63] Continuation of Ser. No. 535,506, Jun. 11, 1990, abandoned.

Foreign Application Priority Data

Jun. 12, 1989 [FR] France .................. 89 07736

[51] Int. Cl.$^5$ ............................... F16F 15/12
[52] U.S. Cl. ...................... 464/24; 464/66; 464/68
[58] Field of Search .......... 464/7, 24, 27, 61, 62, 464/64, 66–68; 192/106.2; 74/574

[56] References Cited

U.S. PATENT DOCUMENTS

| | | | |
|---|---|---|---|
| 4,188,806 | 2/1980 | Fall et al. | 464/64 |
| 4,318,283 | 3/1982 | Windish | 464/68 |
| 4,351,168 | 9/1982 | Prince et al. | 464/68 X |
| 4,729,464 | 3/1988 | Friedmann | 464/68 X |
| 4,739,866 | 4/1988 | Reik et al. | 464/24 X |
| 4,782,718 | 11/1988 | Hartig et al. | 464/66 X |
| 4,788,884 | 12/1988 | Reik et al. | 464/68 X |
| 4,813,524 | 3/1989 | Reik | 464/68 X |
| 4,816,006 | 3/1989 | Friedmann | 464/67 |
| 4,889,218 | 12/1989 | Chasseguet et al. | 464/68 X |
| 4,906,220 | 3/1990 | Wörner et al. | 464/68 |
| 4,947,700 | 8/1990 | Kern et al. | 464/7 X |

FOREIGN PATENT DOCUMENTS

| | | |
|---|---|---|
| 0073286 | 3/1983 | European Pat. Off. . |
| 0212041 | 3/1987 | European Pat. Off. . |
| 3624496 | 1/1988 | Fed. Rep. of Germany . |
| 3624498 | 1/1988 | Fed. Rep. of Germany . |
| 2603678 | 3/1988 | France . |
| 2627566 | 8/1989 | France . |
| 2219647 | 12/1989 | United Kingdom ......... 464/68 |

*Primary Examiner*—Daniel P. Stodola
*Attorney, Agent, or Firm*—Longacre & White

[57] ABSTRACT

A torsion damping device includes a support wheel, having first fastening screws for attaching it to a driving shaft, a damper plate, and peripheral springs acting between the support plate and the damper plate. The damper plate, carrying a pair of guide rings, constitutes, together with the springs and a drive plate, a torsion damper which is contained in a sealed housing, the components of which are secured together by second fastening screws.

The inner periphery of the sealed housing has a diameter greater than that of the pitch circle on which the holes for the first fastening screws are arranged in the support wheel, while the damper plate emerges radially from the housing, in a manner which provides axial location but circumferential sliding movement of the damper plate in the housing while preserving sealing. The second fastening screws of the housing are separate from the first fastening screws and their holes in the support wheel, while one of the components defining the housing carries a cover for urging the torsion damper into rotation, the latter being conformed so as to cooperate therewith.

10 Claims, 2 Drawing Sheets

TORSION DAMPING DEVICE WITH PERIPHERAL RESILIENT MEANS ARRANGED IN A SEALED HOUSING, PARTICULARLY FOR AUTOMOTIVE VEHICLES

This is a continuation of application Ser. No. 07/535,506, filed Jun. 11, 1990, which was abandoned upon the filing hereof.

FIELD OF THE INVENTION

This invention relates to torsion damping devices, in particular for automotive vehicles, being of the kind comprising a support wheel which is provided with fastening means, for example simple holes, arranged around a pitch circle, for securing the support wheel to a first shaft, for example a driving or input shaft; a hub or damper plate which is adapted to be coupled in rotation to a second shaft, for example a driven or output shaft; and peripheral resilient means acting between the support wheel and the damper plate.

BACKGROUND OF THE INVENTION

One torsion damping device of the above kind is disclosed in particular in European published patent application No. EP 0 073 286A. In that disclosure, the peripheral resilient means act in a dry state. Having regard to their radial displacements under the effects of centrifugal force on the one hand, and to their relative displacements with respect to the rings (commonly known as guide rings) between which they are arranged, on the other hand, it is desirable to provide a degree of lubrication, at least in certain applications.

French published patent application No. FR 2 627 566A proposes, with the above in mind, to arrange the peripheral resilient means within a sealed annular housing, which is formed in two parts and fixed with respect to the support wheel. This housing then contains a lubricating fluid. It is arranged to carry and enclose within it a torsion damper comprising the peripheral resilient means, the damper plate and both guide rings. The two parts of the housing are fixed to each other radially outside the said resilient means, using appropriate fastening means. In addition, the torsion damper is fixed to one of the two parts of the sealed housing, while spacing rings connect the two parts together in a sealed manner in such a way as to allow the last-mentioned fastening means (for fastening the housing to the support wheel) to pass through.

However, in the corresponding practical embodiment, the sealed housing extends radially only within the circumference defining the pitch circle on which the fastening means securing the support wheel to the first shaft are arranged. In consequence, it is necessary first of all to fasten the support wheel on to the driving shaft before it is possible to fit the housing by means of its said spacer rings. Although this arrangement is satisfactory in service, the assembly operation is somewhat complicated.

In addition, in line with the securing means for the support wheel, the thickness of the sealed housing is extended in the axial direction to that of the heads of the threaded fasteners, such as screws or bolts, which cooperate with the fastening means formed in the support wheel to secure the latter to the first shaft, to the detriment of the overall axial length of the assembly. Besides this, the presence of the spacers complicates the manufacture of the housing.

DISCUSSION OF THE INVENTION

An object of the present invention is to provide a torsion damping device of the kind discussed above, in which the various disadvantages are avoided.

According to the invention, such a torsion damping device is characterised in that the inner periphery of the sealed housing extends over a circumference having a diameter greater than that of the circumference defining the pitch circle on which a first fastening means, i.e. those formed in the support wheel to secure the latter to the first shaft, are arranged, with the damper plate emerging radially in a sealing manner from the sealed housing, in which it is located axially but able to slide in circumferential movement; the device is further characterised in that assembly means, or second fastening means, which secure to each other the components which constitute the sealed housing, ate separate from the first fastening means; and finally, the device is characterised in that at least one of the components constituting the sealed housing carries means lot urging the said torsion damper into rotation, the torsion damper being conformed in such a way as to cooperate with the said means for urging it into rotation.

Due to the invention, the first securing means are arranged for free access, at least at first, i.e. before the fitting of any auxiliary member that may be provided. This facilitates the assembly operation, while the heads of the threaded fasteners for cooperating with the first fastening means preferably extend into the overall volume of the sealed housing, thus improving the axial length of the assembly.

In addition, the operation of assembling the torsion damper into its sealed housing is simplified. Besides this, the first securing means can be radially very close to the inner periphery of the damper plate, and this makes more internal space available. In the published patent specification No. DE 3 515 928A of the Federal Republic of Germany, a torsion damping device has been proposed which has a sealed housing the inner periphery of which extends over a circumference having a diameter greater than that of the circumference defining the pitch circle on which the first fastening means, of the corresponding support wheel, are arranged. However, apart from the fact that in the corresponding embodiment it is the damper plate and not the sealed housing that is secured to the support wheel, the fastening means of the support wheel themselves play a part in the assembly operation of the sealed housing. The latter does not therefore constitute an entity in itself, such as would be susceptible to be manipulated individually, in particular to allow, if desired, any individual testing that might be required to be carried out before fitting.

None of this is true for the torsion damping device in accordance with the invention, in which, by contrast, the sealed housing has the advantage of constituting such a self-contained entity, either by itself individually or in combination with the support wheel when (in one particular kind of embodiment) the support wheel is itself one of the components of the sealed housing.

The various features and advantages of the invention will appear more fully from the description which follows, which is given by way of example only and with reference to the accompanying drawings.

DESCRIPTION OF PREFERRED EMBODIMENTS OF THE INVENTION

Figure 1:
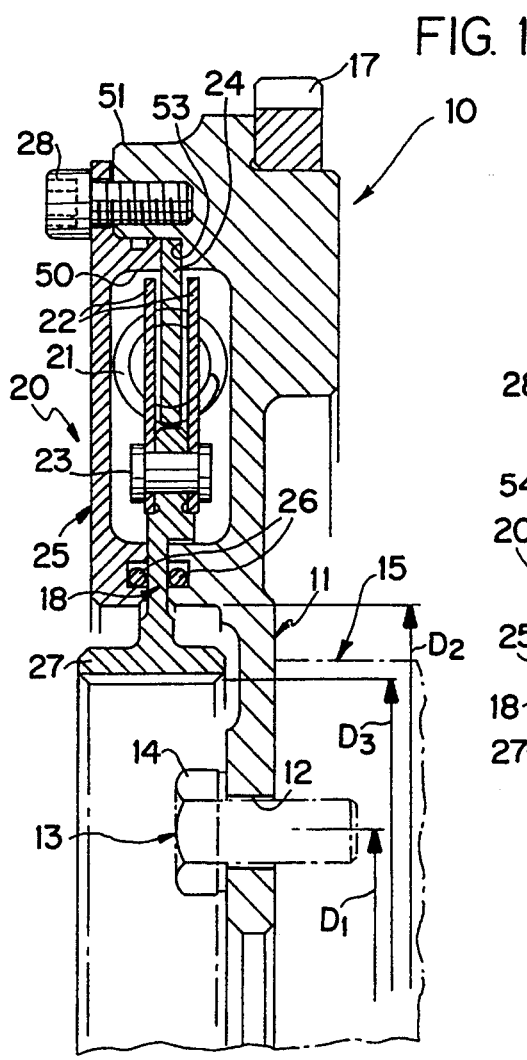
FIG. 1 is a partial view in axial cross section showing a torsion damping device according to the invention.

As shown in the Figures, the torsion damping device 10 comprises a support wheel 11. In its central zone, the support wheel 11 has first fastening means 12, consisting of simple holes in this example, arranged around a circumference defining a pitch circle of diameter $D_1$, whereby the support wheel is secured on a first shaft 15 by means of studs 13 having heads 16. The shaft 15 may for example be a driving or input shaft, and in this example it carries a starter crown 17 on its outer periphery.

The device 10 also includes a damper or hub plate 18, which is arranged to be secured to a second shaft, not shown, for example a driven or output shaft, for rotation of the latter with the hub plate. As will be described below, a sealed annular housing 20 is fixed with respect to the support wheel 11 and contains a lubricating fluid (not shown in the drawings) and peripheral resilient means 21, all acting between the support wheel 11 and the damper plate 18. For simplicity, the contents of the sealed housing 20 are not shown in FIGS. 2 to 5.

In this example, the peripheral resilient means 21 act between two rings 22, called guide rings, and a drive plate 24. The guide rings 22 are secured to the damper plate 18, for rotation with the latter, by means of rivets 23. The drive plate 24 lies between the two guide rings 22 and is fixed to the support wheel 11 for rotation with it in a manner to be described below. The damper plate 18 has an annular portion of increased axial length, as shown in FIG. 1, defining circumferential shoulders for centring the guide rings 22 to enable the rivets 23 to be easily fitted.

The resilient means 21 consist of a plurality of coil springs which are aligned substantially tangentially with respect to a common pitch circle of the assembly, and which are lodged in windows formed in facing relationship to each other in the guide rings 22 and in the drive plate 24. These springs 21, together with the damper plate 18, guide rings 22 and drive plate 24, constitute a torsion damper.

In accordance with the invention, and referring variously to all the Figures of the drawings, the inner periphery of the sealed housing 20 extends along a circumference of diameter $D_2$ which is greater than the diameter $D_1$ of the pitch circle alone which the fastening holes 12 of the support wheel 11 are arranged. The damper plate 18, axially located in the housing 20 but rotatable circumferentially in it in a sliding manner, extends out of the housing in a sealed manner towards the axis of the assembly.

Second fastening means or assembly means 28 secure the various components of the sealed housing 20, and are, as will be described below, separate from the first fastening means 12. At least one of the constituent parts of the sealed housing 20 carries means 50, 32, for urging the torsion damper into rotation. The torsion damper has an element (the drive plate 24 in FIG. 1, or a tooth 30 in FIGS. 6 and 7) for cooperation with means for setting it in rotation. In the embodiments described below, the torsion damper has its said element 24 or 30 at its outer periphery, radially beyond the peripheral resilient means 21.

The sealed housing 20 is defined by two annular components, namely a hollow first member and a second member 25. The hollow first member consists either of the support wheel 11 itself, as in FIGS. 1, 4, 5, 6 and 7, or a member 11' which is separate from the support wheel 11 and which is arranged back to back with the latter as in FIGS. 2 and 3. While in the former case, the support wheel 11 is a component of the sealed housing 20, in the latter case it is separate from the sealed housing, which is made fast with respect to the support wheel 11 in a manner to be described below. The second member 25 forms a cover for the first member of the housing. It will be noted that the hollow first member 11 or 11' has a peripheral flange 51 or 52 respectively at its outer periphery, this flange being axially oriented and acting as a spacer.

The damper plate 18 extends, as mentioned above, out of the inner periphery of the housing 20, being located between the members 11 and 25, or 11' and 25, as the case may be. Two sealing rings 26 are arranged respectively in these members on either side of the damper plate 18, to extend coaxially around the axis of the assembly. The sealing rings 26 are lodged in grooves formed for this purpose in axial flanges which are directed towards each other and formed in the inner periphery of the respective members 11 or 11' and 25. It will be noted also that the damper plate 18, by virtue of its thickened portion mentioned above, is centred by the inner flange of the member 11 or 11', and that it is located by this flange axially at the inner periphery of the housing 20.

Figure 2:
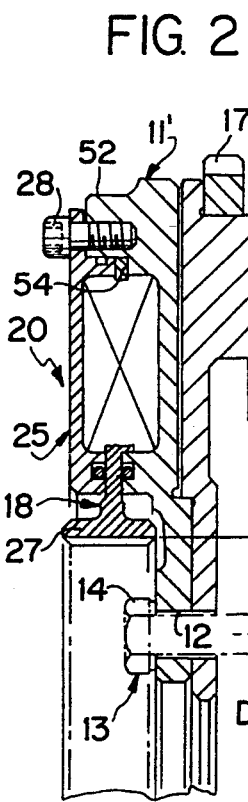
FIGS. 2 to 5 are partial views in axial cross section, similar to that of FIG. 1 but on a smaller scale, and showing four different embodiments in variation on that shown in FIG. 1.
Figure 3:
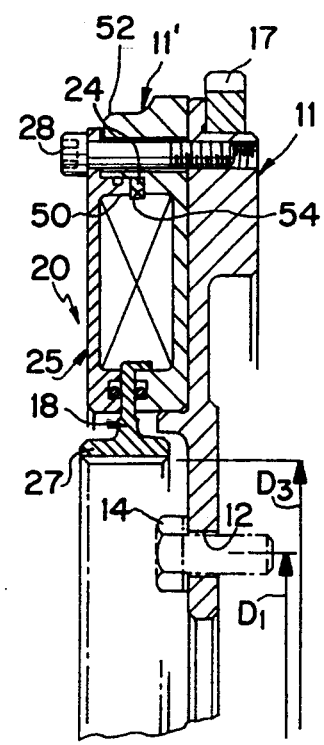

In FIG. 1, and also in FIGS. 2 and 3, the damper plate 18 carries at its inner periphery an integral hub 27 whereby it can be directly mounted on the output shaft to rotate the latter. This hub 27 itself has a bore of diameter $D_3$, which is greater than the diameter $D_1$ of the pitch circle on which the fastening holes 12 are arranged. As a result, these fastening holes 12 are freely accessible, which facilitates the fitting of the screws and thus the operation of mounting the assembly on the input shaft 15.

In this example, the second fastening means 28, for securing the components of the sealed housing 20 together, consist of studs 28 arranged at its outer periphery. Alternatively of course, pins, dowels or other suitable fastening means may be used, In FIGS. 1, 4, 5, 6 and 7, the studs 28 only extend through or into the support wheel 11 and the member which acts as a cover member for the housing 20, namely the cover member 25 in FIG. 1, 125 in FIG. 6 and 225 in FIG. 7. In FIG. 2, they extend through the cover member 25 and into the member 11', the latter, being suitably extended radially for this purpose, being secured to the support wheel 11 by the studs 13, which enables the assembly to be mounted on the input shaft 15. At the same time, the sealed housing 20 is thereby also secured to the support wheel 11.

In FIG. 3, the studs 28 extend right through the member 11', and thus fasten the sealed housing 20 directly to the support wheel 11. In all the embodiments shown, the drive plate 24 is itself secured to the support wheel 11, for rotation with the latter, by the components of the sealed housing 20. In FIG. 1, and also in FIGS. 2, 3, 4 and 5, this fastening is effected by simple gripping of the drive plate 24 between the two members 11 or 11' and 25 constituting the sealed housing 20. For this purpose, the cover member 25 has, radially inward of the studs 28, an axial centring flange 50 which is sealingly enclosed within the outer peripheral flange 52 of the member 11' in FIGS. 2 and 3, or within the flange 51 of the member 11 in FIGS. 1, 4 and 5. The members 11 and 11' have respective shoulders 53 and 54, such that the drive plate 24 is gripped between the shoulder 53 (FIGS. 1, 4 and 5) or 54 (FIGS. 2 and 3) and the free edge of the flange 50. The drive plate 24 is also centred by the flange 51 or 52 of the member concerned.

The cover member 25 thus carries the means for setting in rotation the torsion damper 24, 21, 22, 18 itself, having a configuration (i.e. the outer periphery of the drive plate 24 extending radially outwardly beyond the springs 21) for cooperation with the said driving means.

Figure 6:
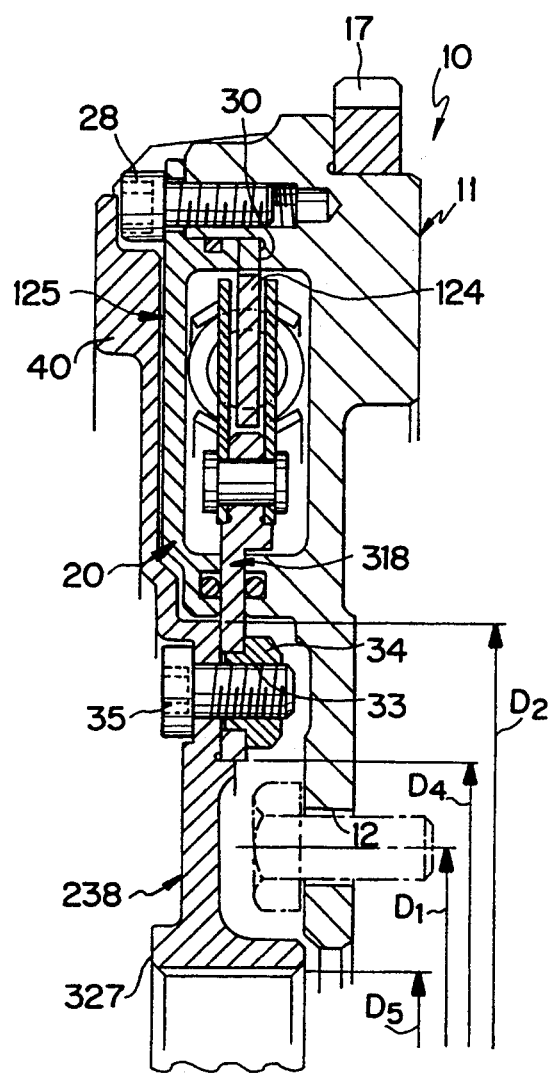
FIGS. 6 and 7, which are on the same scale as FIG. 1, are partial views in axial cross section showing two further embodiments.

In FIG. 6, location or rotation is obtained by meshing with one of these members, more particularly the cover member 125, and for this purpose at least one tooth 30 is provided between the cover member 125 and the drive plate 124. This engagement is thus of the tenon and mortice type.

Figure 7:
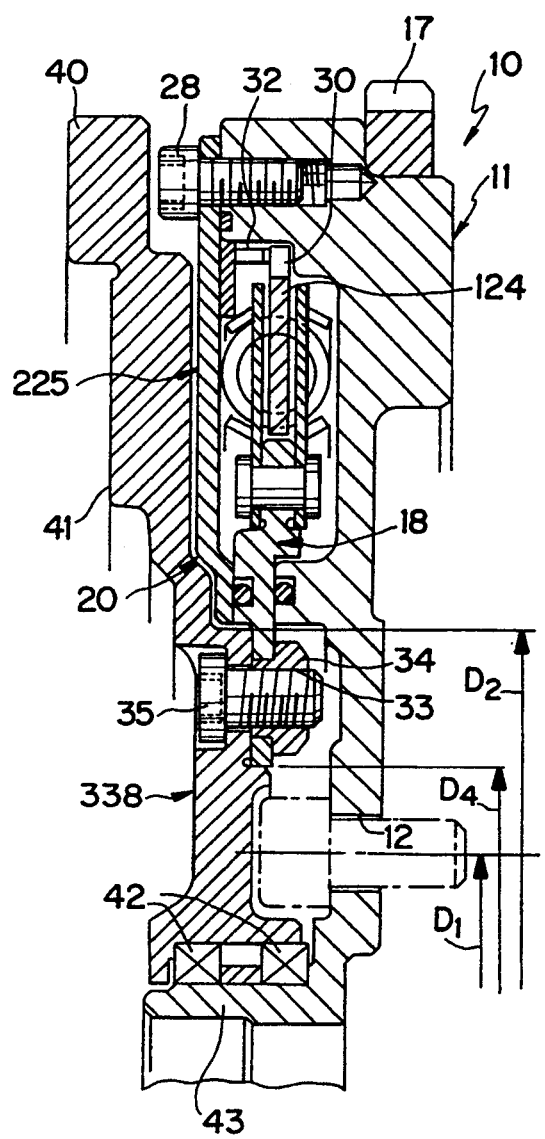

In the modification shown in FIG. 7, this tooth 30 acts between the drive plate 124 and an auxiliary member 32 which is fixed with respect to the cover member 225. The tooth 30 is of course able to act between the flange 51 or 52 and the drive plate 24 or 124.

Figure 4:
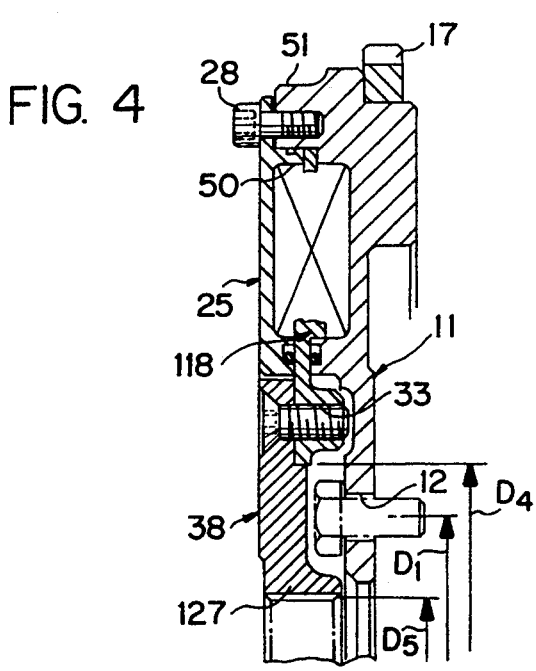
Figure 5:
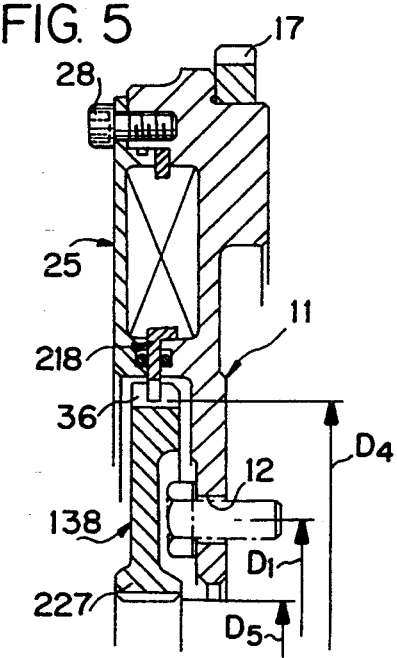

In FIGS. 4 to 7, the damper plate, 118 in FIG. 4, 218 in FIG. 5 and 318 in FIGS. 6 and 7, has driving means at its inner periphery. The driving means may for example comprise fixing means 33. In these examples these fixing means consist of simple holes, which are formed either directly in the damper plate as in FIG. 4, or in nuts 34 carried by the damper plate as in FIGS. 6 and 7, for engagement with screws 35. Alternatively, the driving means may be in the form of meshing means, for example a simple tooth or set of teeth 36 as in FIG. 5. The damper plate may have an auxiliary member attached to it through these driving means. As shown in the drawings, this auxiliary member 38 in FIG. 6, 138 in FIG. 5, 238 in FIG. 6 and 338 in FIG. 7 is adapted to enable it to be indirectly fastened to the output shaft for rotation with the latter. In this example, the auxiliary member is hollowed out to accommodate the heads 16 of the studs or bolts 13.

In substitution for the hub 27 (FIGS. 1 to 3), the inner periphery of the damper plate 18 can extend over a circumference having a diameter $D_4$ which is greater than the diameter $D_1$ of the pitch circle on which the fastening means 12 of the support wheel 11 are arranged. As before, a space is thus left for free access to the fastening means 12 before the attachment of the auxiliary member 38, 138, 238 or 338, which can extend radially inwardly of the fastening means 12.

In FIG. 4, and also in FIGS. 5 and 6, this auxiliary member 38 (138 and 238 respectively in FIGS. 5 and 6) defines the hub 127 (FIG. 4), 227 (FIG. 5) or 327 (FIG. 6) at its inner periphery. If desired—and as shown—this hub can then extend over a circumference having a diameter $D_5$ which is smaller than the pitch circle diameter $D_1$. It should be noted that in FIGS. 4 and 5, the auxiliary member 38 or 138 is generally contained entirely within the space delimited axially by the components of the sealed housing 20.

In FIGS. 6 and 7, the auxiliary member 238 or 338 also has at its outer periphery, and in front of the sealed housing 20, an annular inertia mass 40. In FIG. 7 this further includes a reaction surface 41, for engagement with a friction clutch disc and mounted radially within the inertia ring 40. The assembly then constitutes a reaction plate of the duplex reaction plate damper or double flywheel torsion damper type. In such a case it is through such a reaction plate that the damper plate 18 is adapted to be secured to the output shaft for rotation with the latter.

In FIG. 7, rolling bearings 42 are interposed between the auxiliary member 338 and a sleeve 43 which is formed integrally with the support wheel 11. These bearings 42 are arranged radially inwardly of the fastening means 12, which enables their size to be reduced.

As will be clear from the foregoing description and the drawings, the operation of assembling the torsion damper 18, 22, 21, 24 in its housing 20 is performed by simple insertion with axial and circumferential fastening being effected by closing the housing with the cover member.

The present invention is of course not limited to the embodiments which have been described and shown. In particular, the structures may be reversed. For example the guide rings 22 may be connected to each other through spacers and be gripped between the cover member 25 and the member 11 or 11' as in FIGS. 1 and 2, the drive plate 24 being in this case fixed with respect to the damper plate 18. It is also possible in this configuration to drive one of the guide tines in rotation by means of the member 11 or 11', and to drive the other by means of the cover member 25 using at least one set of teeth as in FIGS. 6 and 7.

What is claimed is:

1. A torsion damping device comprising a support wheel defining a pitch circle and having first fastening means arranged around said pitch circle whereby the support wheel can be secured on a first shaft, a damper plate having means for securing the damper plate to a second shaft for rotation therewith, and peripheral resilient means operatively disposed between the support wheel and damper plate, wherein a plurality of components define a sealed annular housing for containing a lubricating fluid, the device further including second fastening means for securing together said components defining said housing, and a torsion damper which includes said peripheral resilient means and said damper plate and which is enclosed within said housing, the radially innermost periphery of said damper plate having a diameter greater than that of said pitch circle of the first fastening means, with the damper plate projecting radially and sealingly from said housing in which the damper plate is located axially and able to slide circumferentially, the second fastening means being separate from the first fastening means, and the device further comprising means for urging said torsion damper into rotation and carried by one of said components of the housing, the torsion damper including two guide rings and means securing said guide rings for rotation with the damper plate, the device further including a drive plate disposed between said guide rings, the peripheral resilient means being disposed operatively between said guide rings and the drive plate, with two of said components of said housing gripping said drive plate between them so as to couple the drive plate to the support wheel for rotation therewith, said second fastening means are located radially outside an outermost periphery of said drive plate.

2. A torsion damping device according to claim 1, wherein the support wheel is one of the said component parts of the sealed housing.

3. A torsion damping device according to claim 1, wherein the support wheel is a member separate from the components of the sealed housing.

4. A torsion damping device according to claim 1, wherein the sealed housing is defined by two annular components namely a hollow first member and a second member forming a cover for said first member, said first member having a shoulder and an outer peripheral flange at its outer periphery, said flange being axially oriented and acting as a spacer, said second member having an axial centering flange which is sealingly enclosed within said outer peripheral flange of said first member such that the drive plate is gripped between said shoulder and free edge of said axial centering flange.

5. A torsion damping device comprising a support wheel defining a pitch circle and having first fastening means arranged around said pitch circle whereby the support wheel can be secured on a first shaft, a damper plate having means for securing the damper plate to a second shaft for rotation therewith, and peripheral resilient means operatively disposed between the support wheel and damper plate, wherein a plurality of components define a sealed annular housing for containing a lubricating fluid, the device further including second fastening means for securing together said components defining said housing, and a torsion damper which includes said peripheral resilient means and said damper plate and which is enclosed within said housing, the radially innermost periphery of said damper plate having a diameter greater than that of said pitch circle of the first fastening means, with the damper plate projecting radially and sealingly from said housing in which the damper plate is located axially and able to slide circumferentially, the second fastening means being separate from the first fastening means, and the device further comprising means for urging said torsion damper into rotation and carried by one of said components of the housing, the torsion damper including two guide rings and means securing said guide rings for rotation with the damper plate, the device further including a drive plate disposed between said guide rings, the peripheral resilient means being disposed operatively between said guide rings and the drive plate, with said drive plate meshing with an element which is fixed with respect to one of said components of said housing, so as to couple the drive plate to the support wheel for rotation therewith.

6. A torsion damping device comprising a support wheel defining a pitch circle and having first fastening means having a head and arranged around said pitch circle whereby the support wheel can be secured on a first shaft, a damper plate having means for securing the damper plate to a second shaft for rotation therewith, and peripheral resilient means operatively disposed between the support wheel and damper plate, wherein a plurality of components define a sealed annular housing for containing a lubricating fluid, the device further including second fastening means for securing together said components defining said housing, and a torsion damper which includes said peripheral resilient means and damper plate and which is enclosed within said housing, the radially innermost periphery of said damper plate having a diameter greater than that of said pitch circle of the first fastening means, with the damper plate projecting radially and sealingly from said housing in which the damper plate is located axially and able to slide circumferentially, the second fastening means being separate from the first fastening means, and the device further comprising means for urging said torsion damper into rotation and carried by one of said components of the housing, the torsion damper further comprising driving means at the inner periphery of the damper plate, and an auxiliary member carried on the damper plate by means of said driving means, whereby the driving means enables the damper plate to be indirectly coupled in rotation to said second shaft, said inner periphery of said driving means having a diameter greater than that of said pitch circle, and said second fastening means are located radially outside an outermost periphery of said damper plate, said auxiliary member being hollowed out to accommodate the heads of said first fastening means.

7. A torsion damping device according to claim 6, wherein the auxiliary member is contained entirely within the space delimited axially by the components of said annular housing.

8. A torsion damping device according to claim 7, wherein said auxiliary member defines a hub at its inner periphery, said hub extending over a circumference having a diameter which is smaller than said pitch circle.

9. A torsion damping device according to claim 7, wherein the auxiliary member has an inertia ring located at its outer periphery and axially opposite said support wheel with respect to said sealed housing.

10. A torsion damping device according to claim 9, wherein the auxiliary member further includes a reaction surface for engagement with a friction disc and located radially within the inertia ring whereby said torsion damping device constitutes a reaction plate in two parts.

* * * * *